US012668011B2

(12) United States Patent
Marcus et al.

(10) Patent No.: US 12,668,011 B2
(45) Date of Patent: Jun. 30, 2026

(54) ULTRASONICALLY ASSISTED POLYMER EXTRUSION

(71) Applicant: Edison Welding Institute, Inc., Columbus, OH (US)

(72) Inventors: Miranda Marcus, Columbus, OH (US); Amin Moghaddas, Columbus, OH (US)

( * ) Notice: Subject to any disclaimer, the term of this patent is extended or adjusted under 35 U.S.C. 154(b) by 475 days.

(21) Appl. No.: 18/142,098

(22) Filed: May 2, 2023

(65) Prior Publication Data

US 2024/0367362 A1 Nov. 7, 2024

(51) Int. Cl.
*B29C 48/14* (2019.01)
*B29C 48/395* (2019.01)
*B29C 48/505* (2019.01)

(52) U.S. Cl.
CPC .......... *B29C 48/143* (2019.02); *B29C 48/395* (2019.02); *B29C 48/505* (2019.02)

(58) Field of Classification Search
None
See application file for complete search history.

(56) References Cited

U.S. PATENT DOCUMENTS 6,203,747 B1 * 3/2001 Grunitz ................. B29C 45/585
366/100
2015/0183149 A1 * 7/2015 Chow ................... B29C 48/143
425/200

FOREIGN PATENT DOCUMENTS

ES 2719324 T3 * 7/2019 ....... B29C 48/25682

OTHER PUBLICATIONS

PBD Plastics Jan. 26, 2021 https://www.pbsplastics.com/what-is-the-difference-between-plastics-extrusion-and-injection-molding/ (Year: 2021).*

* cited by examiner

*Primary Examiner* — Armand Melendez

(57) ABSTRACT

An extrusion system comprising an ultrasonic component that includes an ultrasonic transducer having an ultrasonic transducer body; and an extrusion apparatus configured to receive ultrasonic vibrations from the ultrasonic component, wherein the extrusion apparatus includes a rotating extruder screw housed within a heated barrel and wherein the heated barrel is configured to receive material to be extruded therein; a connector coupled with the ultrasonic transducer body and the rotating extruder screw, wherein the connector directs ultrasonic energy from the ultrasonic transducer directly into the entire rotating extruder screw in a longitudinal manner; and an extrusion die connected to the barrel, wherein the extrusion die is configured to receive and process the material from the barrel.

3 Claims, 10 Drawing Sheets

ULTRASONICALLY ASSISTED POLYMER EXTRUSION

BACKGROUND

The disclosed technology relates in general to manufacturing systems, devices, and methods; and more specifically to a polymer extrusion system, apparatus, and method that utilizes a source of ultrasonic energy for assisting with ultrasonic extrusion processes.

Thermoplastic extrusion and three-dimensional (3D) printing systems and technologies are commonly used in plastic forming processes such as injection molding; fused deposition modeling; blow molding; and the extrusion of sheet, bar, and tube stock. Generally, in thermoplastic extrusion processes, a polymer is melted in an extrusion barrel and forced through feed tubes to a die. Ultrasonic energy, which may offer certain processing benefits such as reduced polymer viscosity and increased heating rate of the polymer, may be applied to a thermoplastic extrusion apparatus at either the die or at the extrusion barrel. However, the application of ultrasonic energy to the die or barrel of the extrusion apparatus may also cause thermal degradation to the polymer pellets and melt receiving the ultrasonic energy, thereby causing damage to the final product or otherwise shortening its useful life. The structural integrity of the extrusion apparatus may also be negatively impacted by the application of ultrasonic energy to the apparatus.

Accordingly, there is an ongoing need for a thermoplastic extrusion apparatus that is configured to receive ultrasonic energy in a manner that prevents damage to the apparatus and the extruded polymer while using the ultrasonic energy to reduce the time and energy required to melt the polymer within the extrusion barrel, and while simultaneously reducing the viscosity of the polymer for allowing more rapid extrusion of the polymer from the apparatus.

SUMMARY

The following provides a summary of certain example implementations of the disclosed technology. This summary is not an extensive overview and is not intended to identify key or critical aspects or elements of the disclosed technology or to delineate its scope. However, it is to be understood that the use of indefinite articles in the language used to describe and claim the disclosed technology is not intended in any way to limit the described technology. Rather the use of "a" or "an" should be interpreted to mean "at least one" or "one or more".

One implementation of the disclosed technology provides a first extrusion system, comprising an ultrasonic component, wherein the ultrasonic component includes an ultrasonic transducer having an ultrasonic transducer body; and an extrusion apparatus configured to receive ultrasonic vibrations from the ultrasonic component, wherein the extrusion apparatus includes a rotating extruder screw housed within a heated barrel, wherein the heated barrel is configured to receive material to be extruded therein; a connector coupled with the ultrasonic transducer body and the rotating extruder screw, wherein the connector directs ultrasonic energy from the ultrasonic transducer directly into the entire rotating extruder screw in a longitudinal manner; and an extrusion die connected to the heated barrel, wherein the extrusion die is configured to receive and process the material from the heated barrel.

The ultrasonic transducer and the rotating extruder screw may be configured to vibrate at the same ultrasonic frequency. The ultrasonic frequency may be at least 15 kHz. The material to be extruded may be a polymer, and the polymer may be provided in pellet form. The rotating extruder screw may be rotated at least 200 revolutions per minute for a barrel diameter of about 0.787 inches using a low viscosity polymer. The rotational speed of the extruder screw is codependent on the diameter of the barrel and the viscosity of the polymer being extruded. The heated barrel may further include an inlet for receiving the material to be extruded. The inlet may include a source of vibration and a source of cooling air for preventing the material from sticking or melting within the inlet. The barrel may be heated to a temperature between 50-100° F. above a predetermined critical flow temperature of the polymer. The extruder screw further includes an internal cavity to receive a step stud having an upper portion and a lower portion, and wherein the upper portion is greater in diameter than the lower portion. The connector may further comprise a collet connected to the ultrasonic transducer body, wherein the collet is configured to receive an upper end of the extruder screw. The use of a step stud allows for the vibration of extrusion screws of much smaller diameter than the transducer and the design of the step stud avoids cracking at the high stress concentration where the diameter is reduced.

Another implementation of the disclosed technology provides a second extrusion system, comprising an ultrasonic component, wherein the ultrasonic component includes an ultrasonic transducer having an ultrasonic transducer body; and an extrusion apparatus configured to receive ultrasonic vibrations from the ultrasonic component, wherein the extrusion apparatus includes a rotating extruder screw housed within a heated barrel, wherein the heated barrel is configured to receive material to be extruded therein, wherein the extruder screw further includes an internal cavity to receive a step stud having an upper portion and a lower portion, and wherein the upper portion is greater in diameter than the lower portion; a connector coupled with the ultrasonic transducer body and the rotating extruder screw, wherein the connector directs ultrasonic energy from the ultrasonic transducer directly into the entire rotating extruder screw in a longitudinal manner; and an extrusion die connected to the barrel, wherein the extrusion die is configured to receive and process the material from the barrel; and wherein the rotating extruder screw is tuned to vibrate at the same ultrasonic frequency as the sonotrode.

The ultrasonic frequency may be at least 15 kHz. The material to be extruded may be a polymer, and the polymer may be provided in pellet form. The rotating extruder screw may be rotated at least 200 revolutions per minute for a barrel diameter of about 0.787 inches using a low viscosity polymer. The heated barrel may further include an inlet for receiving the material to be extruded. The inlet may include a source of vibration and a source of cooling air for preventing the material from sticking or melting within the inlet. The barrel may be heated to a temperature between 50-100° F. above a predetermined critical flow temperature of the polymer. The connector may further comprise a collet connected to the ultrasonic transducer body, wherein the collet is configured to receive an upper end of the extruder screw.

Still another implementation of the disclosed technology provides a third extrusion system, comprising an ultrasonic component, wherein the ultrasonic component includes an ultrasonic transducer with an ultrasonic transducer body; and an extrusion apparatus configured to receive ultrasonic vibrations from the ultrasonic component, wherein the extrusion apparatus includes a rotating extruder screw housed within a barrel, wherein the rotating extruder screw is rotated at least 200 revolutions per minute for a barrel diameter of about 0.787 inches using a low viscosity polymer, wherein the barrel is configured to receive material to be extruded therein, and wherein the barrel is heated to a temperature between 50-100° F. above a predetermined critical flow temperature of the material to be extruded, and wherein the extruder screw further includes an internal cavity to receive a step stud having an upper portion and a lower portion, and wherein the upper portion is greater in diameter than the lower portion; a connector coupled with the ultrasonic transducer body and the rotating extruder screw, wherein the connector directs ultrasonic energy from the ultrasonic transducer directly into the entire rotating extruder screw in a longitudinal manner, and wherein the connector further comprises a collet connected to the ultrasonic transducer body, wherein the collet is configured to receive an upper end of the extruder screw; and an extrusion die connected to the barrel, wherein the extrusion die is configured to receive and process the material from the barrel; and wherein the rotating extruder screw is tuned to vibrate at the same ultrasonic frequency as the ultrasonic transducer, and wherein the ultrasonic frequency is at least 15 kHz.

The heated barrel may further include an inlet for receiving the material to be extruded, and the inlet may include a source of vibration and a source of cooling air for preventing the material from sticking or melting within the inlet.

It should be appreciated that all combinations of the foregoing concepts and additional concepts discussed in greater detail below (provided such concepts are not mutually inconsistent) are contemplated as being part of the technology disclosed herein and may be implemented to achieve the benefits as described herein. Additional features and aspects of the disclosed system, devices, and methods will become apparent to those of ordinary skill in the art upon reading and understanding the following detailed description of the example implementations. As will be appreciated by the skilled artisan, further implementations are possible without departing from the scope and spirit of what is disclosed herein. Accordingly, the drawings and associated descriptions are to be regarded as illustrative and not restrictive in nature.

BRIEF DESCRIPTION OF THE DRAWINGS

The accompanying drawings, which are incorporated into and form a part of the specification, schematically illustrate one or more example implementations of the disclosed technology and, together with the general description given above and detailed description given below, serve to explain the principles of the disclosed subject matter, and wherein:

FIGS. 5A-5C depict an example implementation of the plasticating or extruder screw component of the extrusion system of FIG. 1, wherein FIG. 5A is a perspective view of the shaft and flights of the extruder screw, and wherein FIGS. 5B-5C depict modifications made to the extruder screw in certain implementations of the disclosed extrusion system;

DETAILED DESCRIPTION

Figure 1:
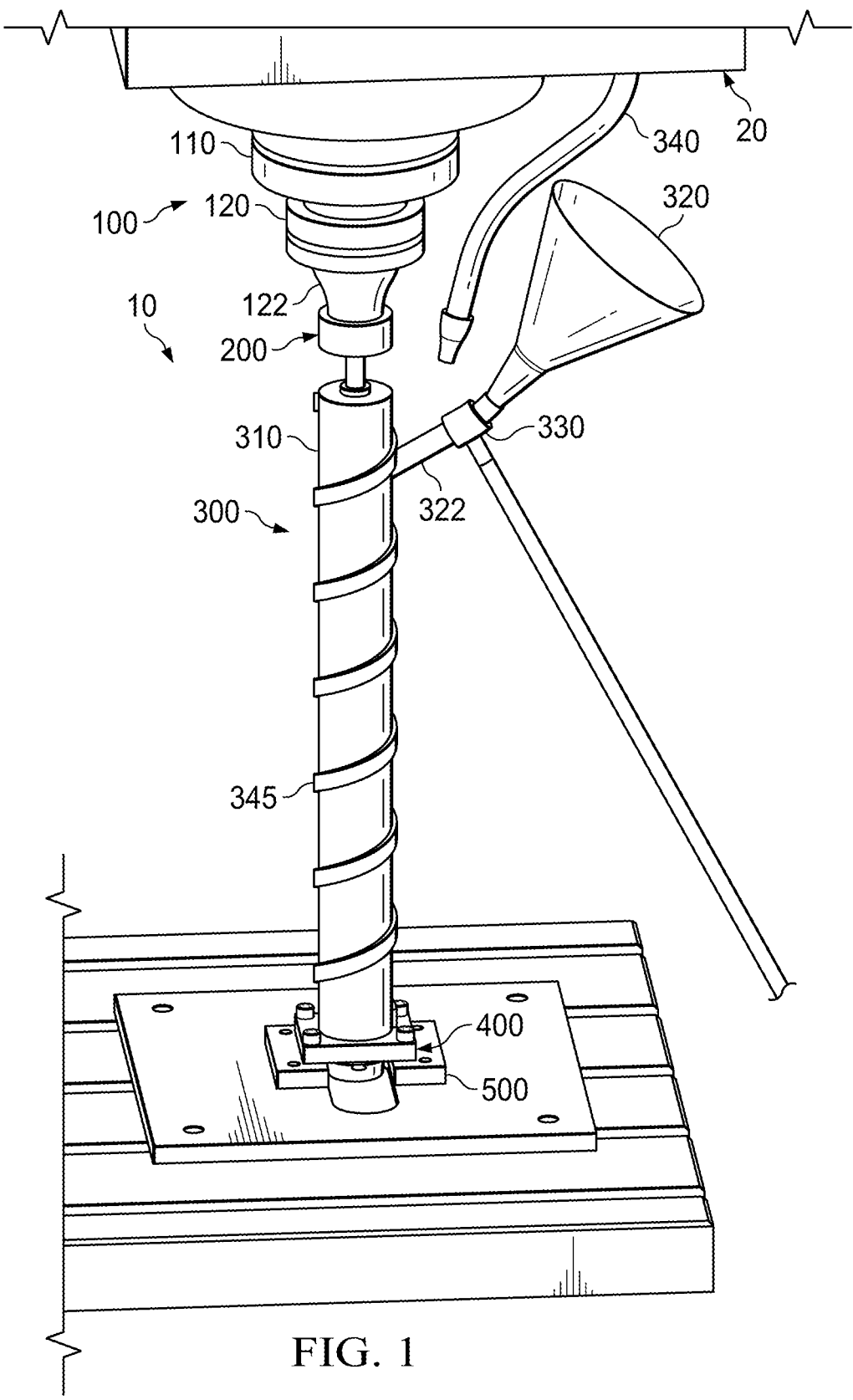
FIG. 1 depicts a fully-assembled extrusion system in accordance with an example implementation of the disclosed technology.

Example implementations are now described with reference to the Figures. Reference numerals are used throughout the detailed description to refer to the various elements and structures. Although the following detailed description contains many specifics for the purposes of illustration, a person of ordinary skill in the art will appreciate that many variations and alterations to the following details are within the scope of the disclosed technology. Accordingly, the following implementations are set forth without any loss of generality to, and without imposing limitations upon, the claimed subject matter.

The examples discussed herein are examples only and are provided to assist in the explanation of the apparatuses, devices, systems, and methods described herein. None of the features or components shown in the drawings or discussed below should be taken as required for any specific implementation of any of these the apparatuses, devices, systems or methods unless specifically designated as such. For ease of reading and clarity, certain components, modules, or methods may be described solely in connection with a specific Figure. Any failure to specifically describe a combination or sub-combination of components should not be understood as an indication that any combination or sub-combination is not possible. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

The disclosed technology provides a polymer extrusion system, apparatus, and method that utilizes a source of ultrasonic energy for assisting with ultrasonic extrusion processes used, for example, in 3D printing, additive manufacturing, and large-part manufacturing. The application of ultrasonic energy to the extrusion apparatus during the use thereof decreases the viscosity of a material being extruded from the apparatus while simultaneously increasing the rate of material extrusion due to increased heating, which results from the application of ultrasonic energy to the apparatus. With reference to the Figures generally, an example implementation of extrusion system 10, which is typically used with polymers and plastics, includes ultrasonic component 100; connector component 200, extrusion apparatus 300; extrusion die 400; support plate 500; and base plate 600.

Figure 2:
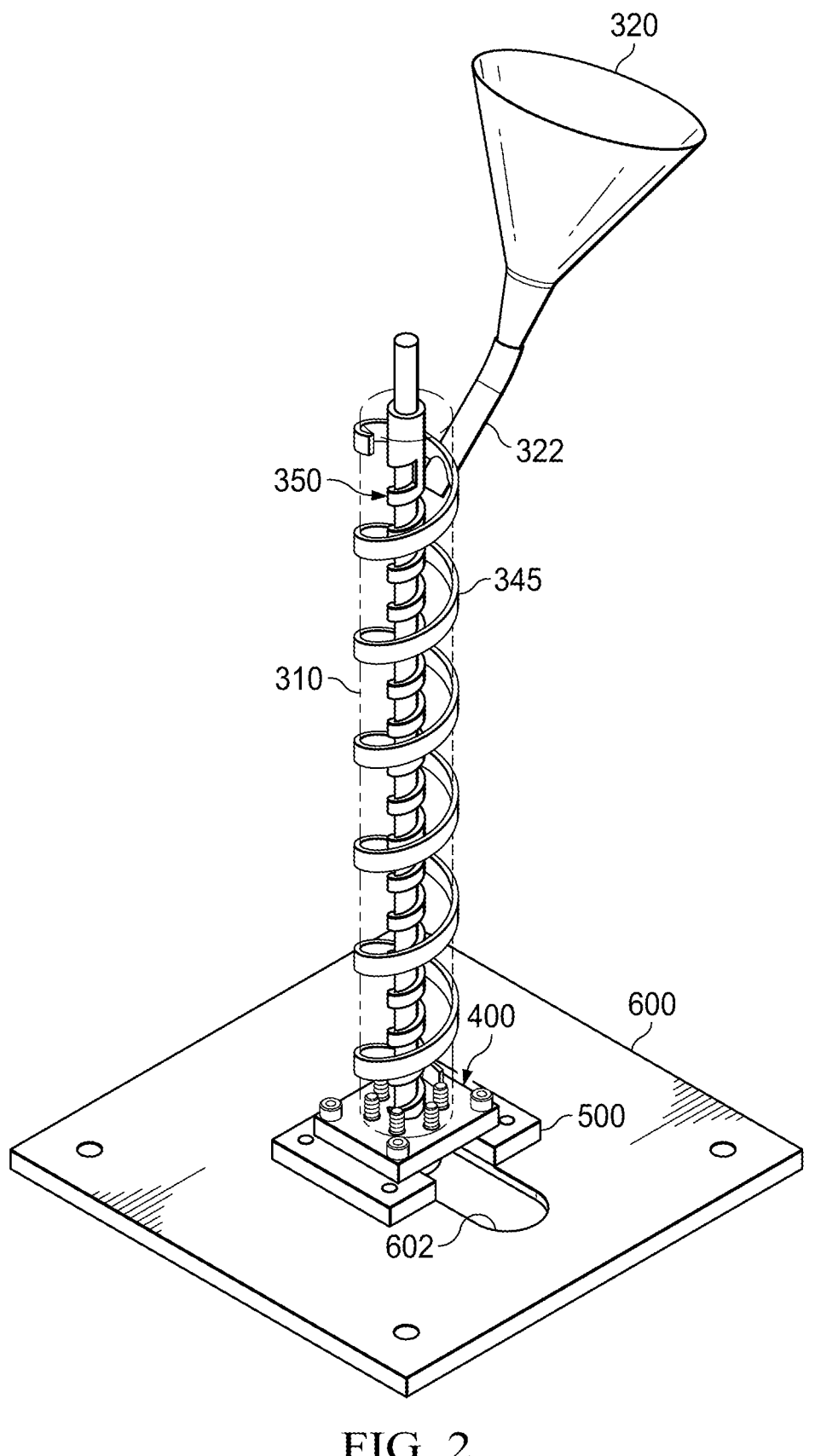
FIG. 2 depicts example implementations of the barrel component and the extruder screw component of the extrusion system of FIG. 1.

As shown in FIGS. 1-2, ultrasonic component 100 includes electrical power supply 110, which is connected to ultrasonic transducer 120, which itself is mounted to ultrasonic transducer body 122. The ultrasonic frequency supplied by ultrasonic transducer 120 may be between 15-50 kHz, for example, depending on the size of the extruder screw used with ultrasonic component 100. In an example implementation, transducer 120 drives transducer body 122 at a vibrational frequency of 20 kHz. Connector 200 connects ultrasonic transducer body 122 directly to a plasticating screw, referred to as extruder screw 350, which is a subcomponent of extrusion apparatus 300. Connector 200 is essentially a compression collet that receives extruder screw 350.

Figure 3:
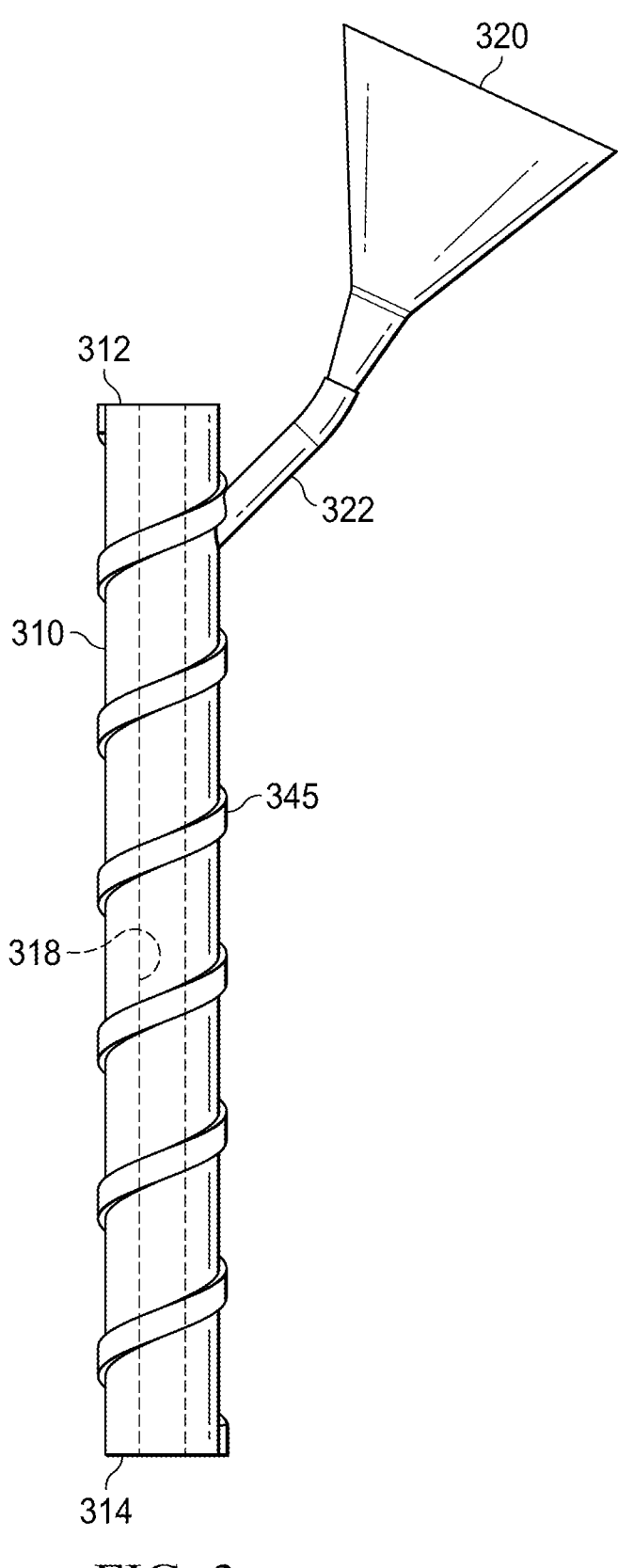
FIG. 3 depicts an example implementation of the barrel component of the extrusion system of FIG. 1, wherein a heating element has been wrapped around the exterior of the barrel.
Figure 4:
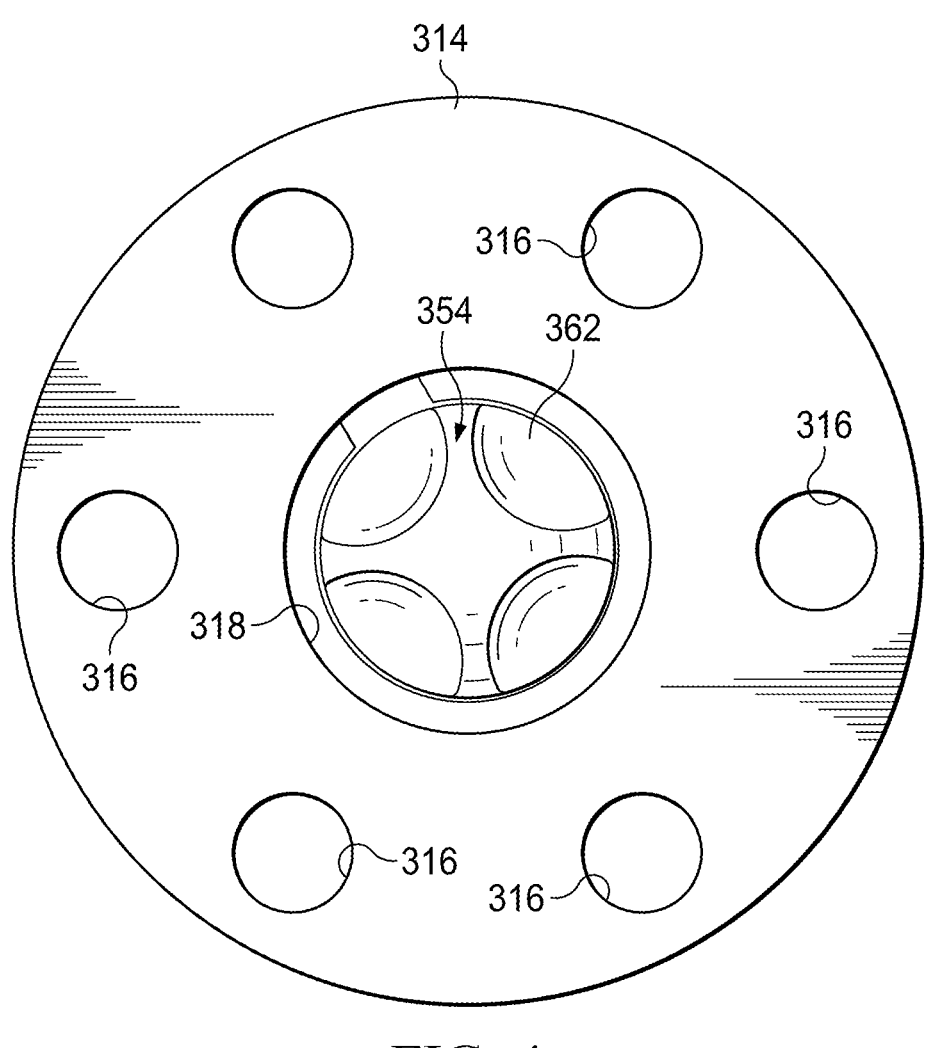
FIG. 4 depicts the bottom or lower end of the barrel component of the extrusion system of FIG. 1, wherein extrusion apertures formed in the lower end of the barrel are shown.

As best shown in FIGS. 1-3, extrusion apparatus 300 includes cylindrical barrel 310; funnel 320; connecting tube 322; pneumatic vibrator 330; source of cooling air 340; heating wrap 345; and extruder screw 350, which is disposed longitudinally within barrel 310. Barrel 310 includes upper end 312, lower end 314, mounting holes 316, and channel 318, which is formed lengthwise through barrel 310 for receiving extruder screw 350. The diameter of channel 318 is slightly larger than the diameter of receiving extruder screw 350 for creating minimal clearance between the two structures. Mounting holes 316 are formed in the lower end 314 of the barrel 310, and channel 318 serves as a passageway for the extruded material exiting barrel 310. Hopper or funnel 320 is positioned slightly below upper end 312 and is connected to barrel 310 by tube 322. Pellets of material to be extruded are added to funnel 320 and pass through tube 322 into channel 316, were the pellets melt. Pneumatic vibrator 330 is attached to the exterior of tube 322 for facilitating movement of the pellets into barrel 310. Source of cooling air 340 is provided to prevent pellets from sticking or melting in tube 322 and to ensure consistent flow of the pellets into the channel 316. Heating wrap 345 is positioned on the exterior of barrel 310 in the manner shown in FIGS. 1-3 and is used to heat barrel 310 to a temperature of at least 320° F. for conductively heating and melting the pellets entering channel 316.

Figure 5A:
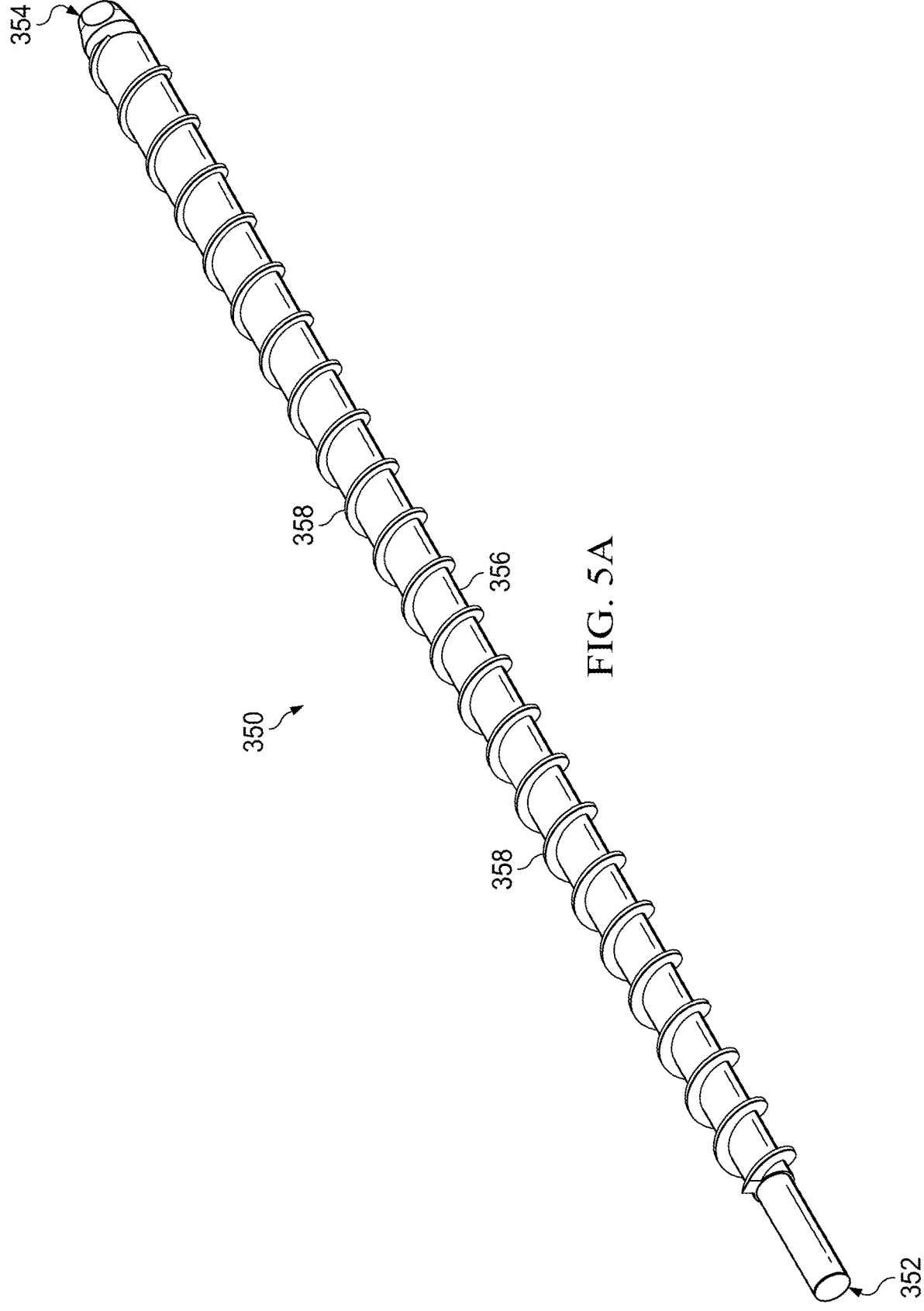
Figure 5B:
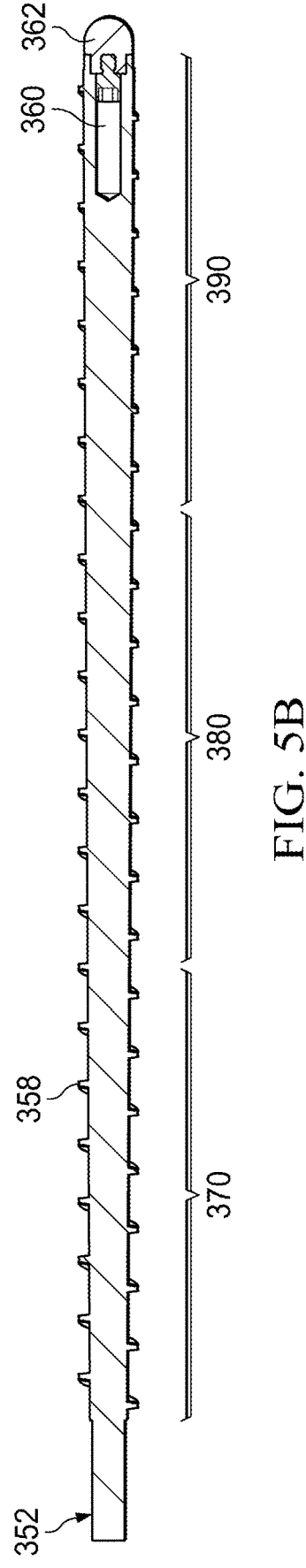
Figure 5C:
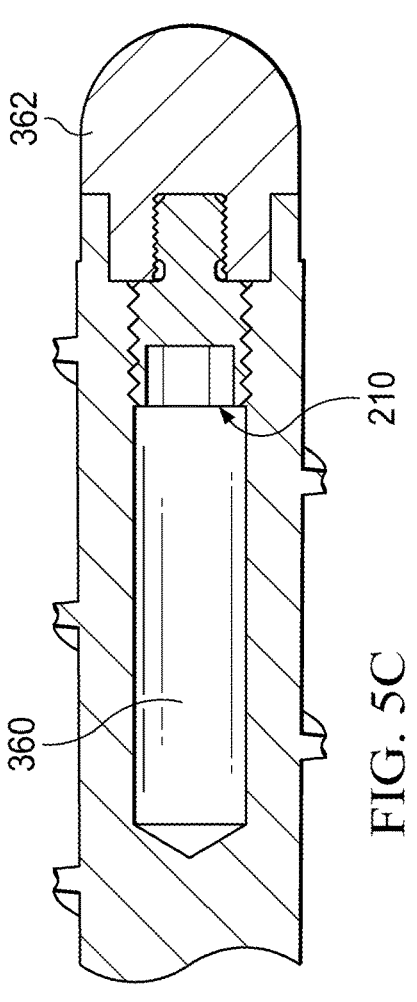
Figure 6:
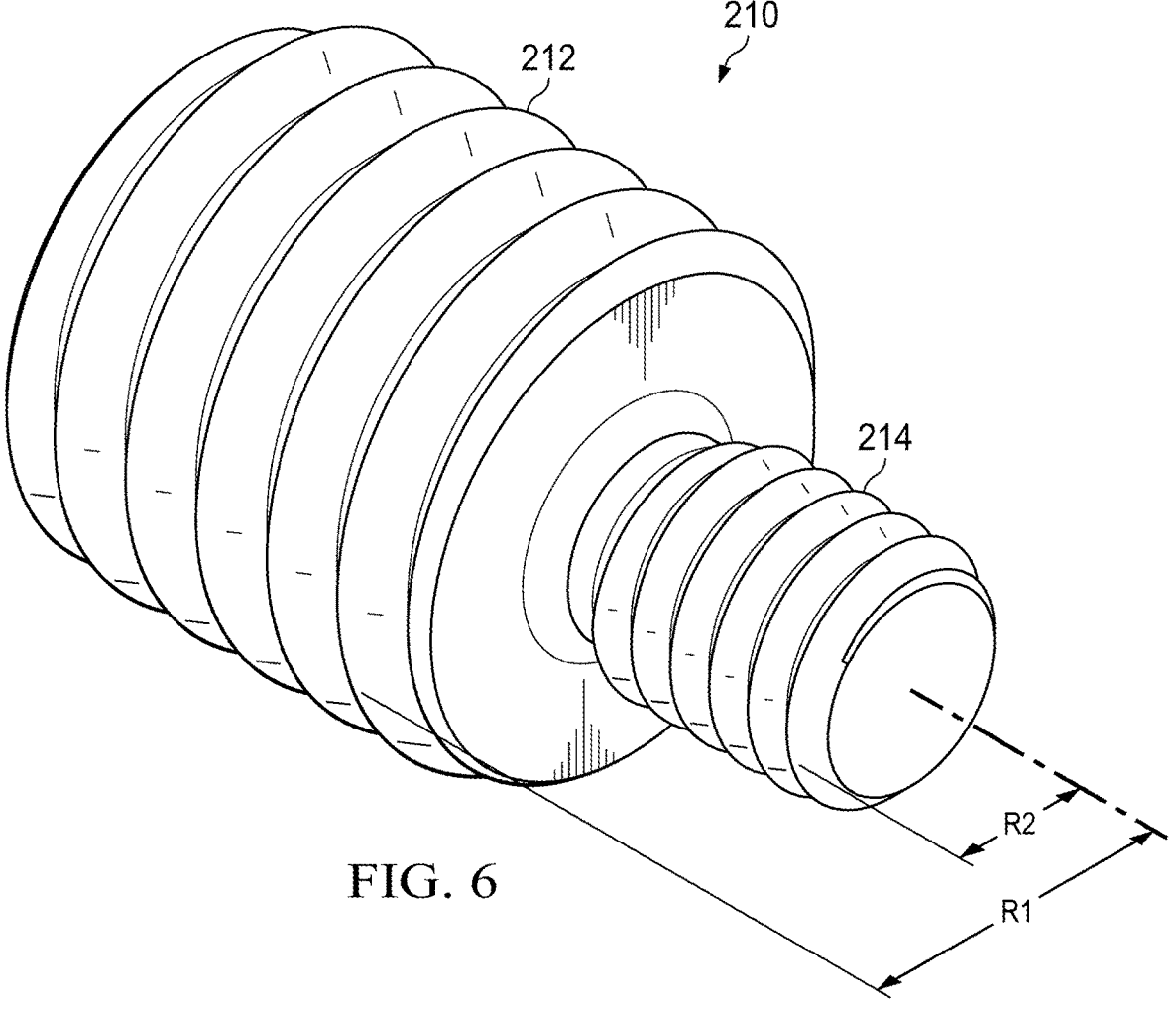
FIG. 6 depicts an example implementation of the step stud component of the extrusion system of FIG. 1.

With reference to FIGS. 2, 4, and 5A-5C, extruder screw 350 is positioned longitudinally within channel 318 and includes upper end 352, lower end 354, shaft 356, a plurality of flights 358, and end tip 362. Upper end 352 is attached to the connector 200. Extruder screw 350 includes certain modifications compared to standard extruder screws including modifications to lower end 354 for cooperating with step stud 210. Further, the geometry of the extruder screw 350 includes certain modifications that create a balanced vibrational behavior and an even amplitude on lower end 354 of extruder screw 350. As shown in FIGS. 5B-5C, lower end 354 is modified to include internal cavity 360 that receives step stud 210. Step stud 210 minimizes the amount of stress occurring at lower end 354 as a result of longitudinal ultrasonic vibrations. The addition of step stud 210 permits direct application of ultrasonic energy to extruder screw 350 without causing a point of weakness in extruder screw 350, namely at lower end 354 where stress and amplitude are typically high. Step stud 210 includes threaded upper portion 212, which is inserted into internal cavity 360 first; and threaded lower portion 214, which is flush with end tip 362. Upper portion 212 has a predetermined radius R1 and lower portion 214 has a predetermined radius R2, wherein radius R1 is greater than radius R2 (see FIG. 6). The overall dimensions of step stud 210, including these two radii, may vary based on the operational parameters of the system in which step stud 210 is utilized. In one implementation, internal cavity 360 has the same radius as radius R1 of upper portion 212, thereby tightly securing step stud 210 within internal cavity 360. The reduction in diameter between upper portion 212 and lower portion 214 reduces stress occurring within step stud 210 and the extruder screw 350 during the application of ultrasonic energy, thereby ultimately reducing the likelihood of part failure. The use of step stud 212 further allows for the replacement of extruder screw end tip 362, which is highly susceptible to wear and degradation. Screw end tip 362 is typically a replaceable part in extrusion equipment, and step stud 212 allows screw end tip 362 to be replaceable with the use of ultrasonic vibration, as well. Any point of connection in ultrasonic systems and devices creates a high stress area, so connection devices and techniques must be designed to prevent cracking. Step stud 212 is used specifically to reduce stress at the connection point and the design of step stud 212 avoids cracking at the high stress concentration region where the diameter is reduced.

With further reference to FIGS. 5A-5C, the diameter of shaft 356 of extruder screw 350 is slightly tapered along the length of extruder screw 350 and the number of flights, flight pitch, flight width, helix angle, and channel depth may be varied along the length of extruder screw 350 based on the zone in which the flights are located. Extruder screw 350 is specifically tuned to ultrasonic transducer 120 and vibrates along its entire length at the same frequency as ultrasonic transducer 120. Different ultrasonic frequencies can be used to vibrate the extrusion screw 350 in a wide variety of diameters from, for example, from 0.25 cm to 12.5 cm in diameter. Extruder screw 350 is also mechanically rotated at a predetermined rate (e.g., 200 revolutions per minute). The combination of ultrasonic vibrations and mechanical rotation effectively melts material and forces the melted material through channel 318 and extrusion aperture 414 of extrusion die 400. The application of ultrasonic vibration to extruder screw 350 increases shear heating rate within channel 318 and reduces viscosity of the polymer melt for achieving more efficient extrusion.

Proper tuning of extruder screw 350 is required for direct application of ultrasonics to extruder screw 350. Operating frequency, amplitude output, and stress are all important factors regarding the performance of ultrasonic vibration of extruder screw 350. If stress is too high, extruder screw 350 may crack. If the operating frequency is not within 25-100 Hz of a selected frequency, ultrasonic transducer 120 may not provide adequate power to extruder screw 350. If amplitude output is too low, then there will be little or no beneficial effect of the ultrasonic vibration on the extrusion process. TABLE 1, below, provides certain design criteria for extruder screw 350 in an example implementation where extruder screw 350 is made of 4140 alloy steel having a fatigue strength of 168 MPa. Finite element analysis was used to design the 4140-alloy steel extruder screw. Modal, harmonic, and frequency response analyses were conducted on extruder screw 350: (i) to determine the frequency and gain of the system and assess longitudinal mode; (ii) to assess the maximum amplitude and stress during vibration, and (iii) to evaluate for parasitic modes. In this example implementation, a 20 kHz power supply and ultrasonic transducer were used. Extruder screw 350 was designed to run within a range of 20 KHz+/−50 Hz. Input peak-peak amplitude is dependent on the design of the transducer. Output peak-peak amplitude is a factor of the input peak-peak amplitude and the gain of extruder screw 350. Gain depends on the design of the extruder screw. The output peak-peak amplitude directly affects the intensity of the ultrasonic vibrations and their effect on the heating rate of the polymer pellets, as well as the viscosity of the polymer melt. For obtaining maximum benefit from ultrasonically active extruder screw 350, the maximum amplitude possible is concentrated in the area where melting is initiated, and in the area(s) where reducing viscosity is most advantageous, such as in mixing and pumping zone 390 (see FIG. 5B).

TABLE 1

| | | | | | | |
|---|---|---|---|---|---|---|
| | | | Output | | | |
| | | Input | Peak- | | Max | |
| | | Peak- | Peak | | Von- | |
| | | Peak | Tip | | Mises | |
| | Frequency | Amplitude | Amplitude | | Stress | Parasitic |
| | (Hz) | (μm) | (μm) | Gain | (MPa) | Mode |
| Design Criteria | 20,000 | 24 | 20 | 0.83 | <168 | No |
| Finite Element Results | 20,003 | 24 | 19.6 | 0.82 | 88.1 | No |

The von Mises stress is a measure of the stress that is expected to result in part failure, such as cracking of extruder screw 350. Ideally, any stress experienced by extruder screw 350 will be well below design criteria. In some instances, ultrasonic tools or extruder screws may have a parasitic mode which includes an undesired secondary ultrasonic frequency. If this secondary ultrasonic frequency is too close to the desired frequency, then power supply 110 may have difficulty keeping the tool or extruder screw running in a preferred mode, which is undesirable when applying ultrasonics directly to an extruder screw.

Extruder screw 350 includes multiple zones along its length, including feed zone 370, melting zone 380, and mixing or pumping zone 390 (see FIG. 5B). These zones can be optimized to focus ultrasonic energy from ultrasonic component 100 where it is most desired on extruder screw 350. In one implementation, ultrasonic energy is focused in melting zone 380 of extruder screw 350 to increase ultrasonic vibrations and to increase the heating rate of the polymer being extruded. In another implementation, ultrasonic energy is focused in mixing or pumping zone 390 of extruder screw 350 to reduce melt viscosity and improve the flow speed of the polymer being extruded. Extruder screw 350 has multiple amplitude locations suitable for optimizing the ultrasonic effect. The amplitude is greatest on the extruder screw 350 directly after feeding zone 370, in the middle of melting zone 380, in the center of mixing zone 390, where upper end 352 is connected to the connector 200, at lower end 354 of the extruder screw 350, and at end tip 362 where the polymer is extruded.

Figure 7:
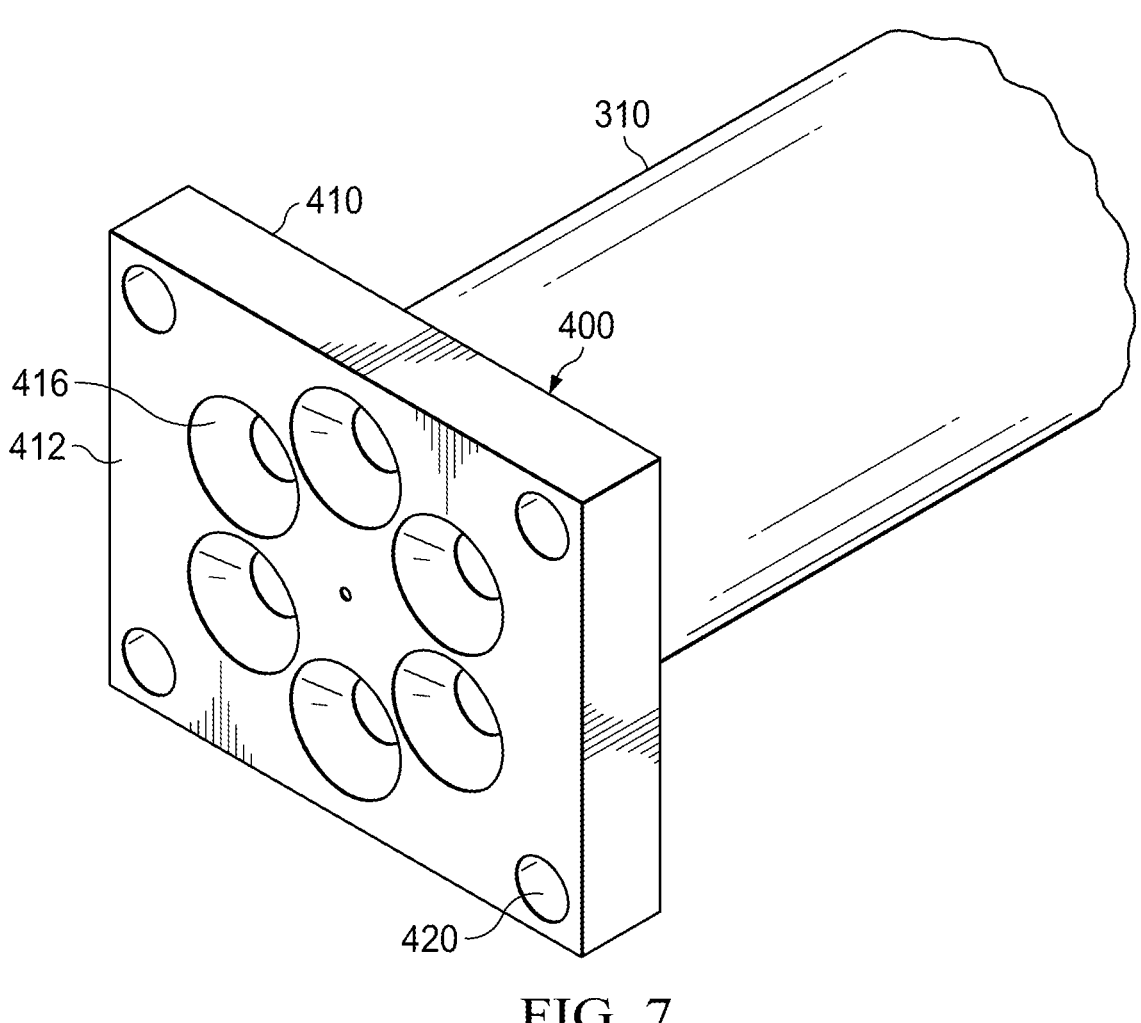
FIG. 7 depicts an ex ample implementation of the extrusion die component of the extrusion system of FIG. 1, wherein the extrusion die component is shown attached to the lower end of the barrel component.
Figure 8:
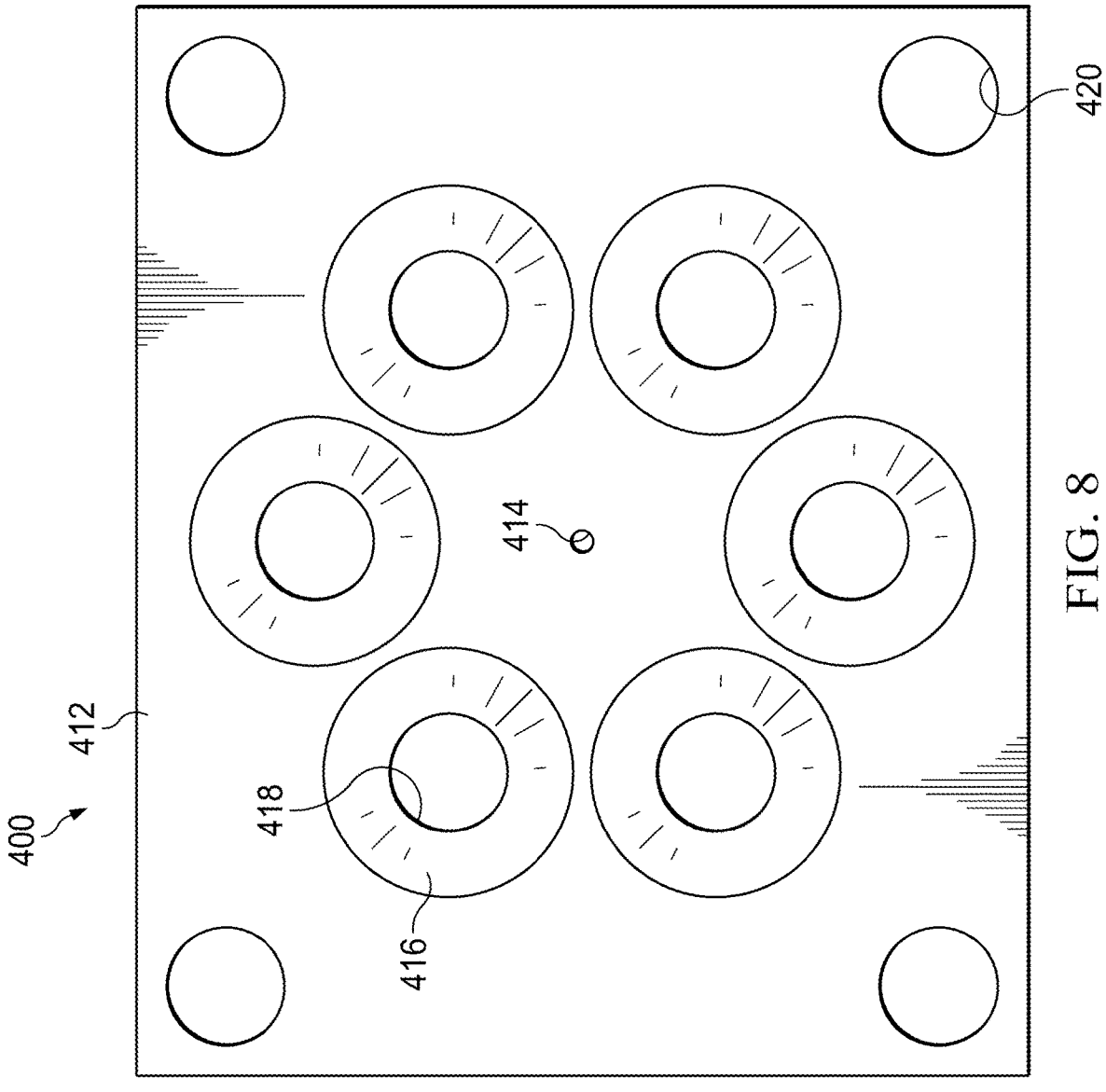
FIG. 8 depicts the bottom surface of the extrusion die component of FIG. 7 showing the die cavities formed therein.
Figure 9:
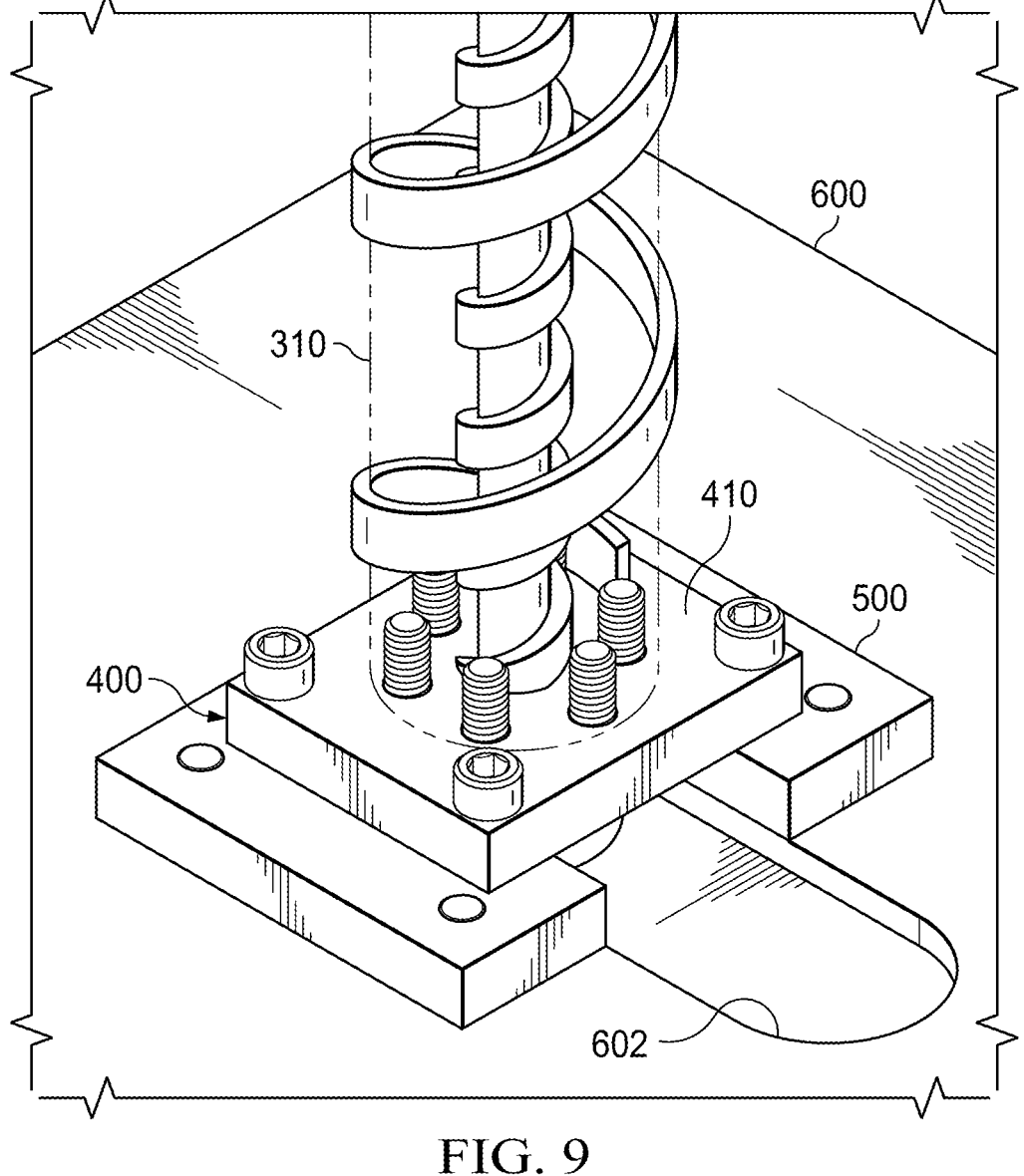
FIG. 9 depicts example implementations of support plate and base plate components of the extrusion system of FIG. 1, wherein the channel formed in base plate component is shown.

Extrusion die 400 is mounted on or attached to lower end 314 of barrel 310 (see FIG. 7) and includes upper surface 410, lower surface 412, extrusion aperture 414, countersink for receiving holes 416, receiving holes 418, and fastening holes 420. Countersink for receiving holes 416 include a conical geometry, with the larger diameter portion of the conical shape being located in lower surface 412 and the smaller diameter portion being located in upper surface 410 (see FIG. 8) and aligned with mounting holes 316, which are formed in lower end 314 of barrel 310. Screws are inserted through receiving holes 418 and mounting holes 316 to secure barrel 310 to extrusion die 400. Extrusion die 400 is mounted on support plate 500 using screws or bolts inserted though fastening holes 420. Support plate 500 is mounted on base plate 600 and elevates extrusion apparatus 300 above channel 602, which is formed in base plate 600 (see FIG. 9). Material extruded through extrusion die 400 is collected in channel 602.

The use of ultrasonics in extrusion system 10 results in greater penetration into small features in collection channel 602, indicating lower viscosity of the formed melt. In one example implementation, the use of ultrasonics in the extrusion system achieved an additional 15% penetration height. TABLE 2, below, shows the penetration height measurements in molded samples with and without the application of ultrasonics vibrations.

TABLE 2

| | | |
|---|---|---|
| | Feature Measurements. | |
| | Penetration Height Without Ultrasonics (cm) | Penetration Height With Ultrasonics (cm) |
| 1 | 2.74 | 3.21 |
| 2 | 2.73 | 3.23 |
| 3 | 2.25 | 2.86 |
| 4 | 2.07 | 2.38 |
| 5 | 2.23 | 2.99 |
| 6 | 3.21 | 3.1 |
| Average | 2.54 | 2.96 |

All literature and similar material cited in this application, including, but not limited to, patents, patent applications, articles, books, treatises, and web pages, regardless of the format of such literature and similar materials, are expressly incorporated by reference in their entirety. Should one or more of the incorporated references and similar materials differs from or contradicts this application, including but not limited to defined terms, term usage, described techniques, or the like, this application controls.

As previously stated and as used herein, the singular forms "a," "an," and "the," refer to both the singular as well as plural, unless the context clearly indicates otherwise. The term "comprising" as used herein is synonymous with "including," "containing," or "characterized by," and is inclusive or open-ended and does not exclude additional, unrecited elements or method steps. Although many methods and materials similar or equivalent to those described herein can be used, particular suitable methods and materials are described herein. Unless context indicates otherwise, the recitations of numerical ranges by endpoints include all numbers subsumed within that range. Furthermore, references to "one implementation" are not intended to be interpreted as excluding the existence of additional implementations that also incorporate the recited features. Moreover, unless explicitly stated to the contrary, implementations "comprising" or "having" an element or a plurality of elements having a particular property may include additional elements whether or not they have that property.

The terms "substantially" and "about", if or when used throughout this specification describe and account for small fluctuations, such as due to variations in processing. For example, these terms can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%, and/or 0%.

Underlined and/or italicized headings and subheadings are used for convenience only, do not limit the disclosed subject matter, and are not referred to in connection with the interpretation of the description of the disclosed subject matter. All structural and functional equivalents to the elements of the various implementations described throughout this disclosure that are known or later come to be known to those of ordinary skill in the art are expressly incorporated herein by reference and intended to be encompassed by the disclosed subject matter. Moreover, nothing disclosed herein is intended to be dedicated to the public regardless of whether such disclosure is explicitly recited in the above description.

There may be many alternate ways to implement the disclosed technology. Various functions and elements described herein may be partitioned differently from those shown without departing from the scope of the disclosed technology. Generic principles defined herein may be applied to other implementations. Different numbers of a given module or unit may be employed, a different type or types of a given module or unit may be employed, a given module or unit may be added, or a given module or unit may be omitted.

Regarding this disclosure, the term "a plurality of" refers to two or more than two. Unless otherwise clearly defined, orientation or positional relations indicated by terms such as "upper" and "lower" are based on the orientation or positional relations as shown in the Figures, only for facilitating description of the disclosed technology and simplifying the description, rather than indicating or implying that the referred devices or elements must be in a particular orientation or constructed or operated in the particular orientation, and therefore they should not be construed as limiting the disclosed technology. The terms "connected", "mounted", "fixed", etc. should be understood in a broad sense. For example, "connected" may be a fixed connection, a detachable connection, or an integral connection, a direct connection, or an indirect connection through an intermediate medium. For an ordinary skilled in the art, the specific meaning of the above terms in the disclosed technology may be understood according to specific circumstances.

It should be appreciated that all combinations of the foregoing concepts and additional concepts discussed in greater detail herein (provided such concepts are not mutually inconsistent) are contemplated as being part of the disclosed technology. In particular, all combinations of claimed subject matter appearing at the end of this disclosure are contemplated as being part of the technology disclosed herein. While the disclosed technology has been illustrated by the description of example implementations, and while the example implementations have been described in certain detail, there is no intention to restrict or in any way limit the scope of the appended claims to such detail. Additional advantages and modifications will readily appear to those skilled in the art. Therefore, the disclosed technology in its broader aspects is not limited to any of the specific details, representative devices and methods, and/or illustrative examples shown and described. Accordingly, departures may be made from such details without departing from the spirit or scope of the general inventive concept.

What is claimed:

1. An extrusion system, comprising:
   (a) an ultrasonic component, wherein the ultrasonic component includes:
      (i) an ultrasonic transducer having an ultrasonic transducer body; and
   (b) an extrusion apparatus configured to receive ultrasonic vibrations from the ultrasonic component, wherein the extrusion apparatus includes:
      (i) a rotating single-shaft extruder screw having an upper end and a lower end housed within a barrel,
         a) wherein the rotating single-shaft extruder screw is rotated at least 200 revolutions per minute, wherein the barrel is configured to receive material to be extruded therein, and wherein the barrel is heated to a temperature between 50-100° F. above a predetermined flow temperature of the material to be extruded, and
         b) wherein the rotating single-shaft extruder screw further includes an internal cavity formed in the lower end thereof that receives a stress-minimizing step stud having a threaded upper portion and a threaded lower portion, wherein the threaded upper portion is greater in diameter than the threaded lower portion, and wherein the stress-minimizing step stud minimizes vibrational stress occurring at the lower end of the rotating single shaft extruder screw;
      (ii) a connector coupled with the ultrasonic transducer body and the rotating single-shaft extruder screw,
         a) wherein the connector directs ultrasonic energy from the ultrasonic transducer directly into the entire rotating single-shaft extruder screw in a longitudinal manner, and
         b) wherein the connector further comprises a collet connected to the ultrasonic transducer body, wherein the collet is configured to receive an upper end of the rotating single-shaft extruder screw; and
      (iii) an extrusion die connected to the barrel, wherein the extrusion die is configured to receive and process the material from the barrel; and
   (c) wherein the rotating single-shaft extruder screw is tuned to vibrate at the same ultrasonic frequency as the ultrasonic transducer, and wherein the ultrasonic frequency is at least 15 kHz.

2. The system of claim 1, wherein the heated barrel further includes an inlet for receiving the material to be extruded, and wherein the inlet includes a source of vibration and a source of cooling air for preventing the material from sticking or melting within the inlet.

3. The system of claim 1, wherein the material to be extruded is a polymer, and wherein the polymer is provided in pellet form.

* * * * *